United States Patent
Yanagimachi et al.

[11] Patent Number: 5,759,238
[45] Date of Patent: Jun. 2, 1998

[54] METHOD OF REMOVING VOLATILE MATTERS FROM VENT ARRANGEMENT

[75] Inventors: Yukio Yanagimachi, Togura-machi; Hideaki Koda, Ueda, both of Japan

[73] Assignee: A.K. Technical Laboratory, Inc., Nagano-ken, Japan

[21] Appl. No.: 663,356

[22] Filed: Jun. 13, 1996

[30] Foreign Application Priority Data

Jun. 13, 1995 [JP] Japan ................... 7-169332

[51] Int. Cl.⁶ .......................................... B01D 53/02
[52] U.S. Cl. .................. 95/106; 55/522; 95/143; 96/135; 96/136; 264/102; 425/203
[58] Field of Search ........................ 55/522; 95/95, 95/106, 141, 143, 274, 284; 96/189, 193, 218, 134, 135, 136; 264/102; 366/75; 425/203

[56] References Cited

U.S. PATENT DOCUMENTS

| | | | |
|---|---|---|---|
| 4,578,455 | 3/1986 | Pipper et al. | 425/203 |
| 4,632,564 | 12/1986 | Kopernicky | 425/203 |
| 4,636,085 | 1/1987 | Kopernicky | 425/203 |
| 5,283,021 | 2/1994 | Shih | 425/203 |
| 5,385,462 | 1/1995 | Kodama et al. | 425/203 |
| 5,597,525 | 1/1997 | Koda et al. | 425/203 |

FOREIGN PATENT DOCUMENTS 52-43770  4/1977  Japan ......................... 95/274

Primary Examiner—C. Scott Bushey
Attorney, Agent, or Firm—Ostrolenk, Faber, Gerb & Soffen, LLP

[57] ABSTRACT

In a vent arrangement comprising a heating cylinder 1 containing therein a screw and provided with a vent hole 3 and a reduced pressure exhaust path 4 provided with a vacuum pump and connected to the vent hole 3 for draining volatile fractions of a material to be molded from the heating cylinder by reducing the pressure in the vent hole by means of the vacuum pump, said volatile fractions are removed by arranging in the exhaust path a filter unit 7 filled with a granular filtering material 8. The material to be molded is used for the filtering material 8. According to the above construction, it can be achieved to efficiently remove volatile matters by using the molded material as the filtering material of the filter unit arranged in the reduced pressure exhaust path of a vent arrangement.

12 Claims, 1 Drawing Sheet

: 1

METHOD OF REMOVING VOLATILE MATTERS FROM VENT ARRANGEMENT

BACKGROUND OF THE INVENTION

1. Field of the Invention

This invention relates to a method of removing volatile matters produced when crystalline resin such as polyethylene terephthalate is used in an uncrystallized or undried state for a material to be molded in a molding machine that is provided with a vent arrangement.

2. Background Art

Pellets of polyethylene terephthalate, or PET, are generally uncrystallized and transparent. In addition, PET pellets whose water content is short of the equilibrium level are hygroscopic and, if molten while containing such an amount of moisture, can be hydrolyzed to become unmoldable.

When pellets of uncrystallized PET are heated to a temperature higher than the glass transition temperature (Tg) of PET, they become soft and sticky to a slight extent. Sticky PET pellets are poorly bit by the screw of the molding machine and can give rise to a troublesome situation where pellets are not fed to the machine properly. To the contrary, pellets of crystallized PET do not become soft nor sticky at a temperature higher than Tg.

In view of this fact, suppliers of PET pellets typically dry uncrystallized PET pellets at a temperature between 150° and 160° C. or polymerize the PET in the solid phase at a higher temperature in order to dry and crystallize them before bringing them to the market. Thus, commercially available PET pellets are costly if compared with uncrystallized PET pellets. If uncrystallized PET pellets are made commercially available, mold operators who want to use such PET pellets have to dry and crystallize them before putting them to use.

On the other hand, with respect to products obtained by molding PET pellets, the PET pellets are hygroscopic regardless if they are crystallized or not. In generally, therefore, PET pellets are preliminarily dried immediately before they are molded because they have absorbed moisture to an extent that may vary depending on the conditions where they have been stored.

The preliminary drying operation lasts for about 4 hours at 150° C. Additionally, a large dryer is typically installed in an ordinary injection molding machine in an attempt to ensure a continuous supply of material if the material is consumed at an enhanced rate per unit time over a long molding cycle to improve the efficiency of molding operation. Inevitably, the power consumption rate of such a large dryer is very high. Then, the preparatory works for a molding cycle will also be time consuming and, if the dryer malfunctions, the efficiency of the entire molding operation will be seriously affected.

In view of the above circumstances, vent type injection machines are gaining popularity as means for injection molding that do not require preliminary drying. While molding resin by means of an injection machine that is provided with a vent feature is a known technology, it has seldom been adapted to the injection molding of polyethylene terephthalate because acetaldehyde and oligomers drained through the vent hole as volatile fractions pose a problem to be solved.

Condensation, sorption, dissolution and decomposition are popular techniques employed for removing volatile fractions but any of them entails the use of a specifically arranged apparatus that is rather large and costly relative to the corresponding molding machine and hence seldom provides a feasible means for removing volatile matters from a vent arrangement. Any attempt for down-sizing such an apparatus in order to make itself adapted to the corresponding vent arrangement is accompanied by the problem of a poor efficiency with which volatile matters are removed.

In view of the above problems that remain to be solved, it is therefore the object of the present invention to provide a novel method of removing volatile matters contained in the exhaust that is being drained from a vent arrangement in a simple, effective and economic manner without wasting the filtering material.

SUMMARY OF THE INVENTION

According to the invention, the above object is achieved by providing a method of removing volatile matters from a vent arrangement comprising a heating cylinder containing therein a screw and provided with a vent hole and a reduced pressure exhaust path provided with a vacuum pump and connected to the vent hole for draining volatile fractions of a material to be molded from the heating cylinder by reducing the pressure in the vent hole by means of the vacuum pump, characterized in that the volatile fractions are removed by arranging in the exhaust path a filter unit filled with a granular filtering material for which said material to be molded is used.

For the purpose of the invention, preferably, a condenser is arranged in the reduced pressure exhaust path between the vent hole and the filter unit in order to condense and primarily remove the volatile matters being drained, and thereafter the volatile matters are removed by means of the filter unit using the molded material as the filtering material.

While the present invention is not limited by any specific material to be molded by using it, the use of polyethylene terephthalate, polyethylene naphthalate or a mixture thereof is particularly preferable.

DETAILED DESCRIPTION OF THE PREFERRED EMBODIMENTS

Figure 1:
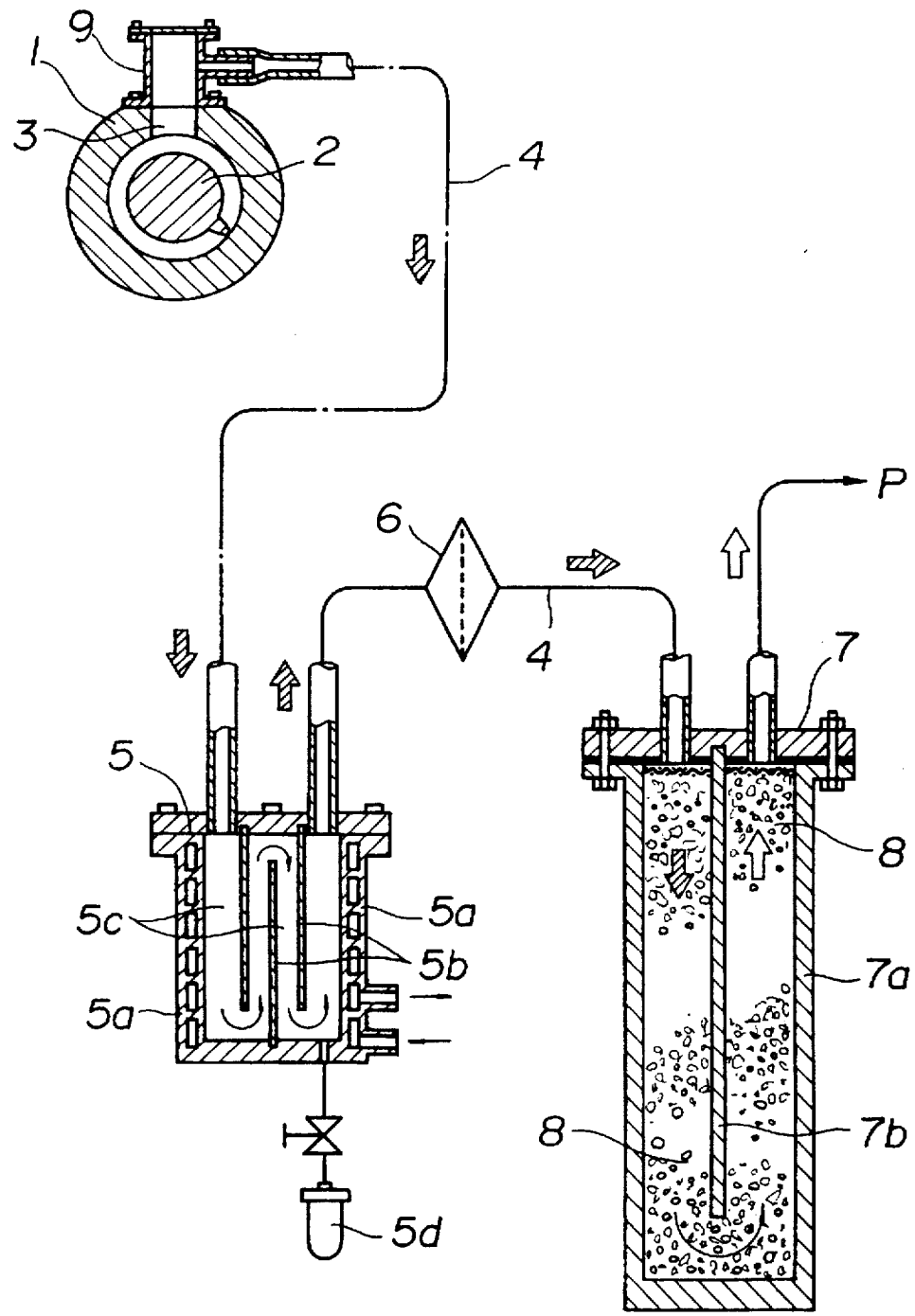
FIG. 1 is a schematic block diagram of a vent arrangement to which a method according to the invention is applicable.

Referring now to the accompanying drawing, there is shown a heating cylinder 1 of a vent type injection machine having an ordinary configuration and provided in the inside with an injection screw 2 that can be moved back and forth. Although not shown, in general construction of such a vent type injection machine such an injection screw 2 comprises a front screw section and a rear screw section each of which comprises a feeding zone and a compression zone, where the compression zone has a diameter greater than the diameter of the remaining zone thereof, and a vent hole 3 is bored through the lateral wall of the heating cylinder in a rear area of the front screw section.

The vent hole 3 is connected by way of a member 9 to a reduced pressure exhaust path 4 provided with a vacuum pump P so that the inside of the vent hole 3 is evacuated while the material to be molded is plasticized and kneaded.

The reduced pressure exhaust path 4 is provided with a condenser 5 for cooling and condensing the volatile fractions of the material to be molded in order to primarily remove them, a mesh filter 6 and a filter unit 7 serially in the above described order from the vent hole so that the volatile matters contained in the exhaust in the reduced pressure vent hole 3 are removed as it sequentially passes through the condenser 5, the mesh filter 6 and the filter unit 7, so as to constitute a vent arrangement.

Said condenser 5 is realized by interdigitally arranging a number of partition panels 5b in a box-shaped jacket 5a along lateral walls of the jacket to define a path 5c for the exhaust drawn into it. The volatile matters including moisture contained in the exhaust that is drawn from the vent hole 3 into the jacket are condensed by a coolant (cold water) flowing through the jacket 5a and moved away through a drain 5d.

The filter unit 7 comprises a bottomed cylindrical main body 7a whose inside is separated into left and right zones by a partition panel 7b, as shown in the drawing, and an easily removable lid member 7c for airtightly sealing the main body, said lid member 7c being provided with an inlet port and an outlet port corresponding respectively to the left and right zones separated by the partition panel 7b. The main body 7a is filled with a filtering material 8, which is the same one as the material to be molded. If the material to be molded is polyethylene terephthalate, the main body 7a is also filled with polyethylene terephthalate. If the material to be molded is polyethylene naphthalate, the main body is also filled with polyethylene naphthalate. In the present invention, since the filtering material is the same one as the material to be molded, if the material to be molded is uncrystallized material, the filtering material may preferably be also uncrystallized material. But of course the filtering material may be used in a state of being uncrystallized, crystallized, undried or dried or mixture thereof.

The exhaust that is flowing through the reduced pressure exhaust path 4 and has passed through the condenser 5 is then drawn into the filtering unit 7 to path through the gaps of the pellets filling the unit as a filtering material 8 and further toward the vacuum pump P. As the exhaust passes through the gaps of the pellets, the volatile matters contained in the exhaust such as acetaldehyde and oligomers are sorbed and removed by the pellets.

In an experiment of removing volatile matters from the exhaust of a vent arrangement having a configuration as described above and using uncrystallized polyethylene terephthalate that has not been subjected to preliminary drying as the material to be molded, the following values were obtained.

filling volume: 10 liters
operating time: 10 hours
added weight: 4 grams

The filtering material 8 could be washed to easily remove the sorbed matters after the end of the experiment and, after drying the material in the ambient air, it could be used as a material for a later molding cycle.

As described above, since the material to be molded is used as the filtering material for removing volatile matters contained in the exhaust coming out of the vent hole, the cost of removing the volatile fractions of the material can be reduced when compared with the case where a different filtering material is used.

Additionally, since the volatile matters contained in the exhaust with reduced pressure are evolved from the material to be molded which is identical with the filtering material, they can be sorbed highly efficiently by the filtering material. Still additionally, since commercially available pellets of the material to be molded have profiles and sizes that are appropriate for producing gaps, through which exhaust can freely pass, any reduction in the sorption efficiency due to a clogged filter can be prevented so that the filtering unit can enjoy a long service life.

Finally, since part of the material to be molded is used as the filtering material, the vent type molding machine can be run, constantly using a fresh filtering material and, after serving for the filtering unit, it can be washed and reused as the material to be molded to eliminate any waste of the material.

What is claimed is:

1. A method of removing volatile matters from a vent arrangement comprising a heating cylinder containing therein a screw and provided with a vent hole and a reduced pressure exhaust path connected to the vent hole for draining volatile fractions of a material to be molded from the heating cylinder by reducing the pressure inside the vent hole wherein arranged in the exhaust path is a filter unit containing filtering material for the material to be molded and the volatile fraction is caused to be evacuated from the heating cylinder through the vent hole and exhaust path by the reduced pressure and wherein the material to be molded and the filtering material is the same material.

2. A method of removing volatile matters from a vent arrangement according to claim 1, wherein a condenser is present in the reduced pressure exhaust path between the vent hole and the filter unit whereby to condense and primarily remove the volatile matters being drained.

3. A method of removing volatile matters from a vent arrangement according to claim 1, wherein the material to be molded and the filtering material is selected from the group consisting of polyethylene terephthalate, polyethylene naphthalate and a mixture thereof.

4. A method of removing volatile matters from a vent arrangement according to claim 1, wherein the material to be molded and the filtering material is polyethylene terephthalate.

5. A method of removing volatile matters from a vent arrangement according to claim 1, wherein the material to be molded and the filtering material is polyethylene naphthalate.

6. A method of removing volatile matters from vent arrangement according to claim 1, wherein the material to be molded and the filtering material is a mixture of polyethylene terephthalate and polyethylene naphthalate.

7. A method of removing volatile matters from a vent arrangement according to claim 2, wherein the material to be molded and the filtering material is selected from the group consisting of polyethylene terephthalate, polyethylene naphthalate and a mixture thereof.

8. A method of removing volatile matters from a vent arrangement according to claim 2, wherein the material to be molded and the filtering material is polyethylene terephthalate.

9. A method of removing volatile matters from a vent arrangement according to claim 2, wherein the material to be molded and the filtering material is polyethylene naphthalate.

10. A method of removing volatile matters from a vent arrangement according to claim 2, wherein the material to be molded and the filtering material is a mixture of polyethylene terephthalate and polyethylene naphthalate.

11. A method of removing volatile matters from a vent arrangement according to claim 2 in which the filtering material is granular and the reduced pressure is established by a vacuum pump.

12. A method of removing volatile matters from a vent arrangement according to claim 1 in which the filtering material is granular and the reduced pressure is established by a vacuum pump.

* * * * *